US005120968A

United States Patent [19]

Fiorito et al.

[11] Patent Number: 5,120,968

[45] Date of Patent: Jun. 9, 1992

[54] EMITTANCE MEASURING DEVICE FOR CHARGED PARTICLE BEAMS

[75] Inventors: Ralph B. Fiorito; Donald W. Rule, both of Silver Spring, Md.

[73] Assignee: The United States of America as represented by the Secretary of the Navy, Washington, D.C.

[21] Appl. No.: 548,652

[22] Filed: Jul. 5, 1990

[51] Int. Cl.[5] ........................ H05H 7/00; G01T 1/20

[52] U.S. Cl. ................................ 250/397; 250/363.01

[58] Field of Search ............................ 250/397, 363.01

[56] References Cited

U.S. PATENT DOCUMENTS

| | | | |
|---|---|---|---|
| 3,180,986 | 4/1965 | Grigson | 250/49.5 |
| 3,207,982 | 9/1965 | Rose | 324/71 |
| 3,293,429 | 12/1966 | Leboutet et al. | 250/41.9 |
| 3,600,580 | 8/1971 | Vogel | 250/71.5 R |
| 3,749,926 | 7/1973 | Lee | 250/49.5 PE |
| 3,937,957 | 2/1976 | Schillalies et al. | 250/305 |
| 3,942,012 | 3/1976 | Boux | 250/385 |
| 4,455,532 | 6/1984 | Gregory et al. | 324/457 |
| 4,584,474 | 4/1986 | Franchy et al. | 250/305 |
| 4,727,250 | 2/1988 | Henzler | 250/305 |
| 4,731,538 | 5/1988 | Gray | 250/397 |

OTHER PUBLICATIONS

Lumpkin et al., "OTR Measurements for Los Alamos Free-Electron Laser Experiments", Nuclear Instr. & Methods, Sec. A vol. A285, No. 1-2, pp. 343-348.

Iversen et al., "Change Particle Beam Divergence Measurements Using OTR" Proceed. of the 1987 IEEE Particle Accelerator (Cat. No. 87CH2387-9) Pub. IEEE, N.Y., pp. 573-575, vol. 1.

Wartski et al., "Interference Phenomenon in OTR & Its Applic. to Particle Beams", J. Appl. Phys. 46(8), 3644-3653 (Aug. 75).

*Primary Examiner*—Janice A. Howell

*Assistant Examiner*—Richard Hanig

*Attorney, Agent, or Firm*—John D. Lewis; Kenneth E. Walden

[57] ABSTRACT

The invention is a device to measure the emittance of a charged particle beam. The device is capable of providing precise time resolution limited only by the chosen detector. The device allows a complete emittance determination as a function of time. The preferred embodiment of the invention comprises a plurality of thin foils 11 which generate an optical transistion radiation (OTR) pattern 13; a lens system 14 to collect the OTR pattern 13 from the said foils 11: an optical mask 16 to allow passage of the OTR pattern 13 :and a detector array 17 or similar device placed behind the mask 16 which intercepts, senses and measures the point source OTR pattern 13 for each perforation in the mask.

14 Claims, 1 Drawing Sheet

EMITTANCE MEASURING DEVICE FOR CHARGED PARTICLE BEAMS

ORIGIN OF THE INVENTION

The invention described herein was made in the performance of official duties by employees of the Department of the Navy and may be manufactured, used, licensed by and for the Government for any governmental purposes without payment of any royalties thereon.

FIELD OF THE INVENTION

The present invention relates to instrumentation for charged particle beams and in particular to devices for measuring emittance of charged particle beams.

BACKGROUND OF THE INVENTION

Prior charged particle beam emittance measuring devices make use of collimators and screens which are cumbersome and expensive. These devices generally are large and non-portable restricting measurements to fixed beamline locations; suffer from electron permeability for high energy beams restricting their usefulness because of material and construction limitations; use phosphor screens limiting the time response of the measurement; and have poor resolution limiting use to large diameter beams. Other techniques such as wire scanners must be placed at multiple stations along the beam line and require successive scanning to determine beam profiles. While wire scanners offer better resolution, they also have limitations. Because successive scanning is necessary, wire scanners are not capable of real time measurements. Beam imaging devices and/or wire scanners have been combined with focusing magnets, which require successive beam profile scans as a function of magnet strength, and thus are not capable of real time measurement. Multiple, non-interactive wall current monitors have been disposed along beam paths, but these devices require elaborate mathematical analyses to provide emittance value. All such multi-positioned devices and measurements are sensitive to errors caused by motion and instability of the particle beam centroid. Further, all prior methods require detailed knowledge of particle trajectories and profiles in order to compute emittance. No prior art method can be used to make time resolved measurements of beam emittance at any location in a particle beam accelerator.

SUMMARY OF THE INVENTION

The invention is an emittance measuring device for charged particle beams. The novel use of optical transition radiation and arrangement of optical components provide new capabilities in measuring charged particle beam emittance. The device comprises one or more thin foils disposed within a charged particle beam for producing optical transition radiation, a lens system for collecting the optical transition radiation, an optical mask or perforated screen and an electronically gated or streaked detector array for providing rapid time measurements. It is an object of this device to measure emittance of charged particle beam divergence as a function of position within the beam profile at any location along the beam trajectory. Another object of the invention is to provide a charged particle beam divergence measuring device which is inexpensive, lightweight, and usable at a plurality of beamline locations. A further object of the invention is to eliminate problems associated with electron permeability in collimating devices. Still another object of the invention is to rapidly measure charged particle beam emittance.

BRIEF DESCRIPTION OF THE DRAWINGS

The above objects and numerous other advantages of the present invention will be readily understood from the following detailed description when read in view of the appended drawing wherein.

DETAILED DESCRIPTION OF THE INVENTION

Figure 1:
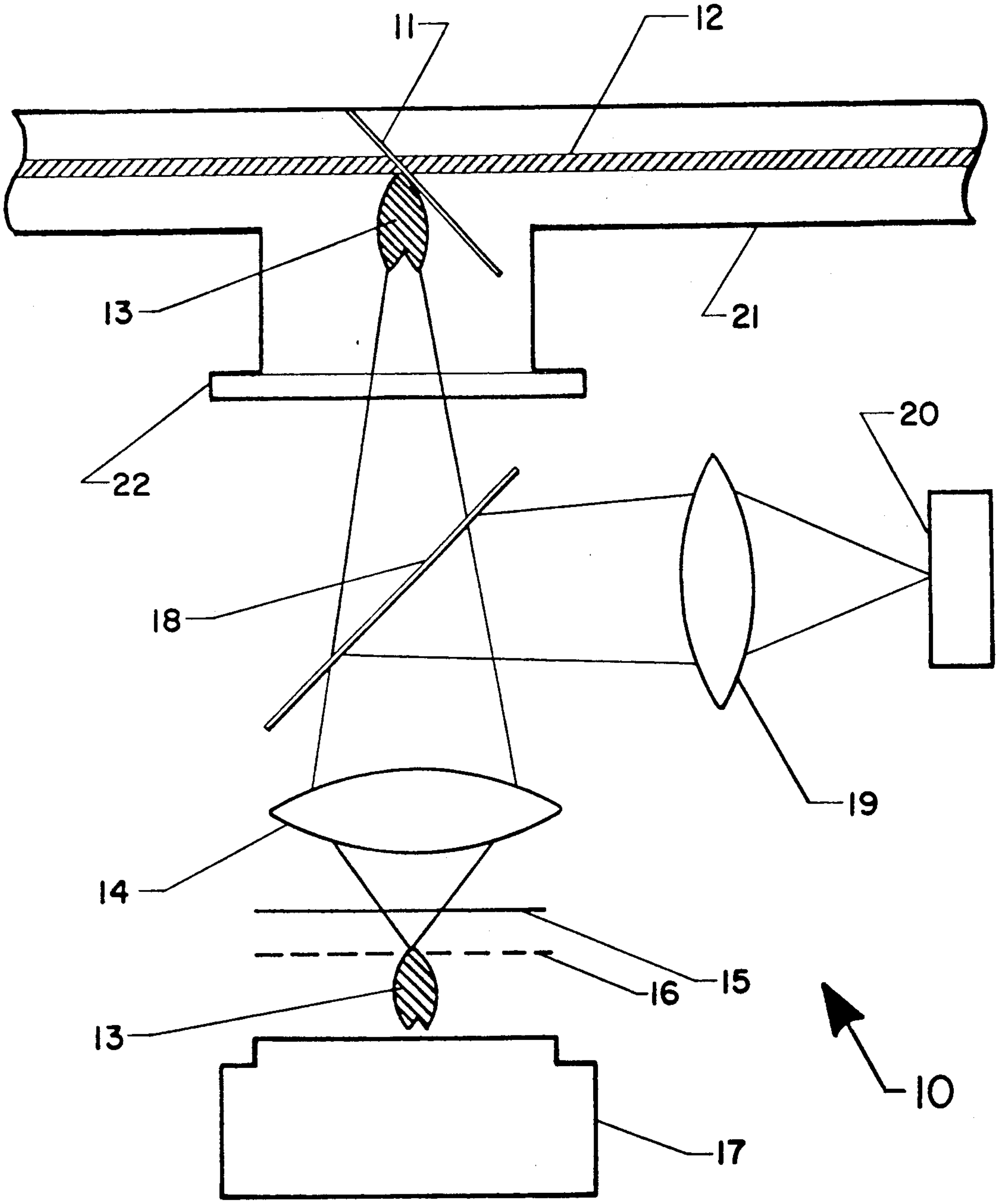
FIG. 1 is a schematic diagram of the components of the emittance measuring device.

Referring now to FIG. 1, the emittance measuring device, depicted generally by the numeral 10, comprises the following components: an electron beam accelerator vacuum tube 21 having an optical window 22; one or more thin foils 11 disposed within a particle beam 12; a first optical system comprising either a simple or complex lens system 14; a polarizer 15; an optical mask 16; a detector array 17; and a second optical system comprising an optical beam splitter 18, a lens system 19 and a camera 20.

The thin foils 11, positioned at an angle of 45 degrees, for illustrative purposes, with the respect to the direction of and within the particle beam 12 and immediately behind optical window 22, serve as generators of optical transition radiation (OTR). The first optical system collects the OTR from the thin foils 11. This optical system must have an aperture sufficiently large to collect a large fraction of optical transition radiation pattern 13 from the entire beam. The optical mask 16 is disposed on the image plane of the lens system 14 allowing the OTR pattern 13 at a corresponding point in the beam profile to pass through a hole in the mask. The detector array is disposed behind the mask for intercepting, sensing and measuring the point source OTR pattern 13 for each perforation in the mask. The detector array 17 can be any one of a number of devices including streak cameras or tubes, optical multi-channel analyzers, linear array or microchannel plate detectors. Any such device must have a sufficient number of pixels to match the required angular resolution desired to map or measure the point source radiation pattern. Resolution is determined from the expected local divergence of an electron beamlet which broadens the point source OTR pattern 13 provided at the thin foils described above, the energy of the electron beam which determines the peak position of the angular pattern of the OTR described, and the wavelength of the light emitted. The optical system comprising beamsplitter 18 lens 19 and camera 20 is used to record the beam distribution image formed on the back of mask 16 overlaid with the mask perforations, so that the local beamlets can be identified with respect to position within the beam profile. The camera (20) in the second optical system for recording an OTR image of the particle beam (spatial distribution of the particle beam) at the site of the thin foil 11, may be any of the above mentioned detectors or an electronically gated television camera.

The radial position of the center of the OTR pattern 13 on the detector 17 with respect to the mask perforation where it originates provides information on the local beamlet trajectory angle. For a discussion of this theory see Louis Wartski, thesis, *Study on the Optical Transition Radiation* Produced by 30 to 70 *MeV Energy Electron Application to the Diagnosis of Beams of Charged*

*Particles*, Universite de Paris. Sud, Centre d'Orsay, France, April 1976 (unpublished). The recorded OTR pattern from each perforation in the mask is used in calculating local beamlet divergence. Namely, the width, shape, filling of the center of each of the local beamlet radiation patterns, and polarization of each of the radiation patterns are measured and fitted to theoretical curves. For a discussion of this theory see D. Rule, Nuc. Instr. and Meth., Vol. B24/25 page 901 (1987). These curves are adaptable for either single foil OTR patterns or OTR interference patterns produced when a multiple thin foil arrangement is used. The ranges of divergences which can be measured with a single OTR foil or two foil OTR interferometer system are dependent on the beam energy. In the case of a twenty MeV electron beam, for example, a single foil system can provide divergence measurements between 2 to 50 milliradians while a two foil interferometer system is capable of a measurement range of about 0.3 to 5 milliradians. From the local beamlet trajectory angle and divergence data, the beam phase space distribution and emittance can be determined in a manner similar to that used to analyze data obtained from conventional slit pinholes. For a discussion of this method see W. Namkung and E. P. Chojnacki Rev. Sci. Instrum. Vol. 57, page 341 March 1986. The principle of the device, namely the local measurement of transition radiation patterns modified by local beam divergence, and simultaneous measurement of beam spatial distribution, is not restricted to the visible spectrum. Other wavelengths such as infrared, ultraviolet, x-ray, or submillimeter radiation could be used with suitable detectors.

The emittance measuring device for charged particle beams disclosed herein overcomes the inherent limitations of conventional measuring devices. The optical nature of the device has several distinct advantages over the methods customarily used and described above. The device employs two optical systems. The first measures local beam trajectory angle and divergence from the analysis of the radiation pattern, the second measures the spatial distribution of the beam. The emittance can be calculated from these two sets of measurements. The first optical system is used to obtain local trajectory angle and divergence by the use of an optical mask without the need for collimating the electron beam. The collimator and material permeability problems attendant with high beam energies are eliminated entirely. The second optical system images the beam spatial distribution. The device can, in principle, be used at any energy. The device can make an entire emittance determination measurement at one location at one time by simultaneously monitoring the spatial distribution of the particle beam current density, and the particle beam divergence and trajectory angle associated with each point of the spatial distribution. The device eliminates the need for multiple scanning devices and the concomitant necessity of modeling the changes of the beam as it transits between positions of the scanning devices. The device dispenses with the need to scan through the beam or vary the magnetic focusing strength. The device also dispenses with the need to measure the beam profile at multiple positions in order to determine beam divergence, and the need to provide a beam waist at the site of any position where the beam profile and divergence are measured. Other methods require complex expensive mechanical devices and long periods of time to complete. This device is only limited in time response to the detector and/or camera gating time, or if a streak tube is used as a detector, the streak sweep time. The device is simpler and easier to employ in comparison to conventional methods. The device can easily be interfaced anywhere foils can be introduced into a beam line. Lastly, since the device is optical in nature, it is less sensitive to electrical interference and noise effects.

It will be understood that the above description of the present invention is susceptible to various modifications, changes and adaptations and that the same are intended to be comprehended within the meaning and range of equivalence of the appended claims.

Having thus described our invention we claim:

1. A device for optically determining phase space distribution and emittance of a charged particle beam at any position in the beam trajectory comprising:
   a. an adjustable supporting assembly disposed adjacent to said beam for supporting other elements of the device;
   b. means for generating optical transition radiation (OTR) patterns attached to said adjustable supporting assembly and disposed within the beam;
   c. a lens system disposed in the path of the OTR patterns for collecting and imaging said OTR patterns generated by said means for generating OTR patterns attached to said adjustable supporting assembly;
   d. an optical mask having perforations connected to said lens system for masking the OTR patterns from multiple positions in an optical image of the charged particle beam; and
   e. a detector disposed behind said optical mask.

2. A device for measuring emittance of a charged particle beam as in claim 1 wherein said means for generating optical transition radiation (OTR) patterns comprise a plurality of thin foils.

3. A device for measuring emittance of a charged particle beam as in claim 1 wherein said means for generating optical transition radiation (OTR) patterns comprise a single thin foil.

4. A device for optically determining phase space distribution and emittance of a charged particle beam at any position in the beam trajectory comprising:
   a. means for generating optical transition radiation (OTR) patterns;
   b. means for collecting the OTR; and
   c. means for masking for resolving the point source OTR pattern for each of multiple positions in a spatial distribution of an image of the beam.

5. A device for measuring emittance of a charged particle beam as in claim 4 wherein said means for generating optical transition radiation comprises a thin foil disposed within the beam trajectory.

6. A device for measuring emittance of a charged particle beam as in claim 4 wherein said means for generating optical transition radiation comprise a plurality of thin foils disposed within the beam trajectory.

7. A device for measuring complete emittance of a charged particle beam as in claim 4 wherein said means for collecting the OTR comprises a lens system having a sufficient aperture that a large fraction of OTR pattern from the entire beam is collected.

8. A device for measuring emittance of a charged particle beam as in claim 4 wherein said means for resolving the point source OTR patterns comprise a multiply perforated mask.

9. A device for measuring emittance of a charged particle beam as in claim 4 wherein said means for resolving the point source of OTR patterns comprise a detector of optical radiation.

10. A device for measuring emittance of a charged particle beam as in claim 9 wherein said detector further comprises an optical multichannel analyzer.

11. A device for measuring emittance of a charged particle beam as in claim 9 wherein said detector further comprises a linear array with a plurality of pixels.

12. A device for measuring emittance of a charged particle beam as in claim 9 wherein said detector further comprises a streak camera having a plurality of pixels.

13. A device for measuring emittance of a charged particle beam as in claim 9 wherein said detector further comprises a streak tube having a plurality of pixels.

14. A device for measuring emittance of a charged particle beam as in claim 9 wherein said detector further comprises a microchannel plate detector having a plurality of pixels.

* * * * *